June 11, 1929. R. O. BERG 1,716,847
WELDING UNIT AND METHOD OF WELDING
Filed June 1, 1926   3 Sheets-Sheet 1
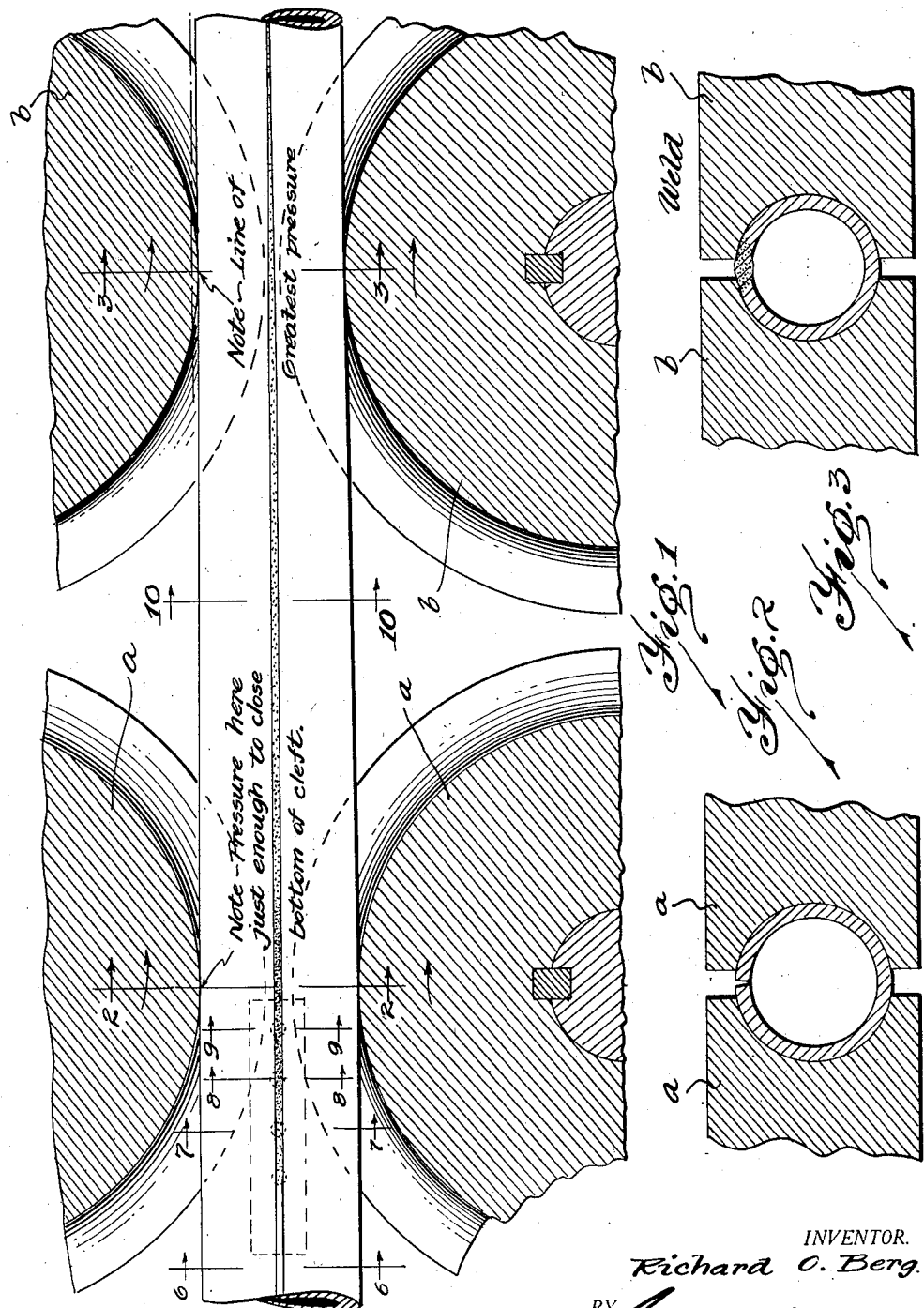
INVENTOR.
Richard O. Berg.
BY
Stuart C Barnes
ATTORNEY.

INVENTOR.
Richard O. Berg.
BY
ATTORNEY.

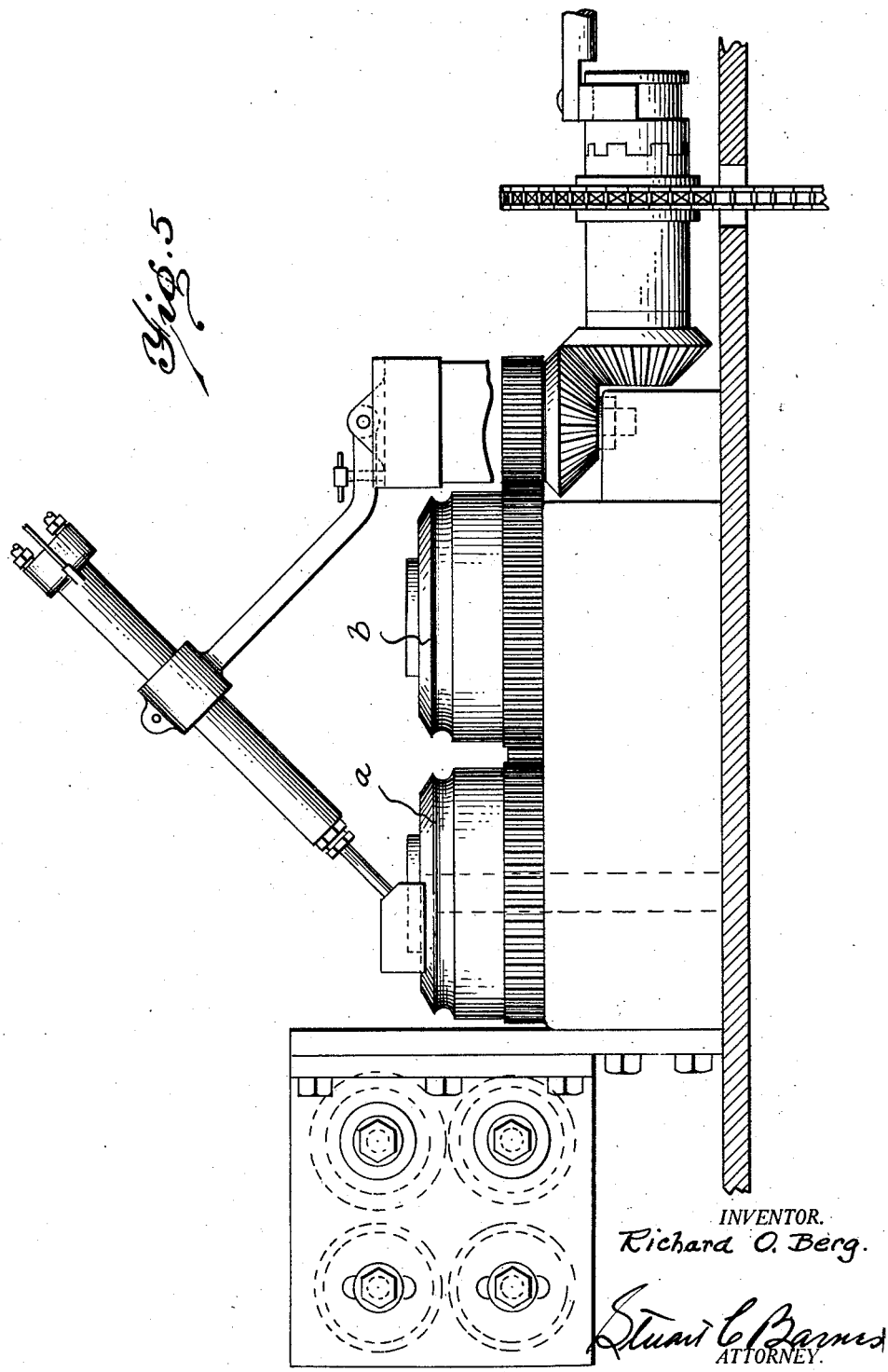

Patented June 11, 1929.

1,716,847

UNITED STATES PATENT OFFICE.

RICHARD O. BERG, OF DETROIT, MICHIGAN, ASSIGNOR TO MICHIGAN STEEL TUBE PRODUCTS CO., OF DETROIT, MICHIGAN, A CORPORATION OF MICHIGAN.

WELDING UNIT AND METHOD OF WELDING.

Application filed June 1, 1926. Serial No. 113,000.

This invention relates to tube welding. It is the object of the present invention to provide an improved unit for gas-welding tube. It has been the general practice heretofore in oxy-acetylene gas welding to use a single pair of so-called "welding" or "compression" rolls, as shown for instance in the patent to Anderson, No. 1,402,996. It has been the practice to apply the welding torch either directly on the line of greatest pressure, as has been recommended by some prior inventors, or to locate the welding torch slightly in advance of the pressure line of the tube welding units. Ordinarily these pressure rolls are positively driven and the feed of the tube through the welding machine has been governed by these compression rolls. We have found that where the compression rolls immediately at or behind the welding jets are utilized to drive the tube considerable difficulties at times attend this form of drive. If the compression rolls are close enough together so as to pinch the tube tightly, this will push up a burr by reason of the soft metal immediately behind the torch. Of course this burr is very objectionable because it must be removed. While a moderate burr is nearly always present in all electric welded tube, it is the object of gas-welded tube to so weld that no perceptible burr occurs. It has therefore been the practice to so adjust the compression rolls that the pressure is not sufficient to throw up a burr. However, in practice, it has been found that by reason of the comparative looseness of the compression rolls the grip on the tube has not been sufficiently firm to reliably and uniformly feed the tube through the machine. The result has been that there is a certain amount of slippage, and in some cases, even stoppage of the tube. This has resulted in burning or blowing holes through the tube due to the excessive heat of the welding torch when the tube momentarily pauses on its way under the torch. This, of course, results in either considerable wastage in tubes, or excess cost in repairing the tube having such faults.

Of course we know that tube has been heretofore fed through welding machines by rolls in advance of the welding rolls which press the red-hot tube together. Such a construction is shown in Anderson, No. 1,402,997. However, where such a feed is employed, the rolls in advance of the torch have been employed to tightly press the edges together and completely eliminate the seam cleft. We have found that by properly co-ordinating four welding rolls with the pinch rolls quite a distance in the rear of the torch and the holding rolls that not only is a more reliable feed achieved, but better welding is secured by reason of tightly pressing the edges of the metal together at a time when the metal is slightly cool and is in a firmer condition and less fluid.

Furthermore, we have found unusually good results follow in heating the tube through. By using a relatively loose initial pair of welding rolls it is possible to heat the tube through with the multiple jet welding torch without using such great pressures in the gases as to blow holes through the tube. The tube edges at the torch are not pushed together so tightly and the heat of the multiple jet welding torch may not easily penetrate to the interior. Where the tube edges are brought together they are not exactly parallel by reason of the faces of the edges being not on true radii. There is a slight divergence from the meeting point which is on the inside. Obviously if the edges are not pushed together by a great pressure under the torch the burning gases can enter this slight cleft and heat the lips of the tube clear to the inside, and the molten metal may run down into the cleft as the tube reaches the point of greatest subjection to the heat of the torch.

In the drawings:

Fig. 1 is a plan view of the tube with the rolls in horizontal cross section.

Fig. 2 and Fig. 3 are cross sections on the lines 2—2 and 3—3 of Fig. 1.

Fig. 5 is a side elevation of the rolls and the welding torch.

Oxy-acetylene welding as now carried on by the most progressive tube-makers is done with one or more lines of small jets of flame. If a single line is used this strikes the tube directly on the line of cleft. If two lines of jet are used these jets strike the tube on opposite sides of the cleft. From two to eight, or even more, are employed in a row. According to the old practice it is customary to use a pair of welding and compression rolls at or just behind the torch. The tube is ordinarily so gripped as to be able to feed the tube through the welding rolls. As already stated, however, the tube cannot be gripped so tightly as to push up an objectionable burr.

Figure 4:
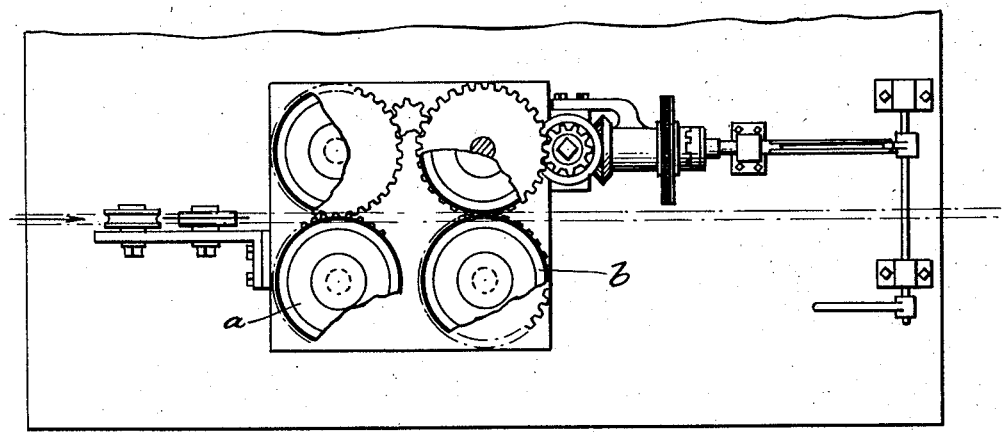
Fig. 4 is a plan view of the welding unit.
Figure 6:
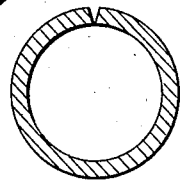
Figs. 6–10 are sections taken on the corresponding section lines of Fig. 1.
Figure 7:
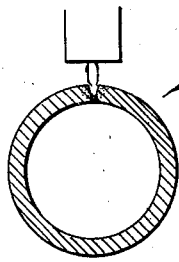
Figure 8:
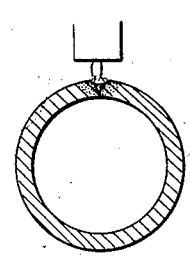
Figure 9:
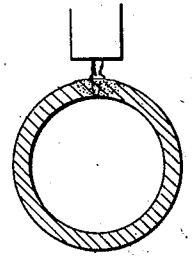
Figure 10:
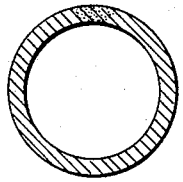

Instead of the two welding rolls I employ two rolls $a$—$a$ in substantially the same position that the two welding rolls have heretofore been located. However, these rolls are not strictly compression rolls in the proper sense of that term as applied to the compression rolls heretofore employed. These rolls are more properly simply "holding and positioning" rolls. Their purpose is to press the two edges lightly together. Inasmuch as these edges, when the strip is bent into the tube, are not on true radii extending from the axis of the tube, it will be apparent that a slight cleft in the top of the tube (as shown in Berg 1,483,272, and Anderson 1,402,996 in advance of the welding rolls), unless such pressure is brought to bear on the tube as to distort the stock to push the edges together at the line between the welding roll center and this is what occurs in such welding units shown in the prior Berg and the prior Anderson patents. A cleft is shown in Fig. 2, directly on the line of the roll centers that may range from five thousandths of an inch upwardly. Now the purpose of the first set of rolls is to "hold" the tube in registry and press the edges towards each other so that they will have a line of contact only on the inside of the tube, as clearly shown in Fig. 2. This leaves a much larger cleft on the outside of the tube under the torch than is afforded by the prior art. This cleft is a very useful thing in connection with our arrangement of rolls for it permits the heat very readily to reach through to the inside of the tube. At the same time the tube is held together at the bottom of the cleft so that none of the liquid metal will drop through the tube into the interior. The heat reaches the inside of the tube in two ways. The first jets that strike the tube (or the burning gases if the two-line torch is used) can reach down to the cleft to the bottom of the cleft. This is shown in Figs. 7 and 8. As succeeding jets strike the metal the same is rendered fluid and flows into the cleft (as shown also in Fig. 8 and in Fig. 9), carrying with it the heat to the very bottom of the cleft and quickly heating up the walls of the cleft to the very bottom.

I find in actual practice it is preferable to considerably relieve the pressure of the front pair of rolls from what has previously been the practice. They may be approximately five thousandths of an inch freer with respect to the tube than has previously been the practice, for they are only desired to press the tube edges together at the bottom of the cleft and are not called upon for any feeding function, nor for pressing the weld together.

Shortly back of this first pair of rolls I employ a second pair of rolls $b$—$b$, the centers of which are preferably about six inches from the first pair of rolls. These rolls are the real compression and feeding rolls. Preferably these rolls are from five thousandths to eight thousandths of an inch closer together than the preceding set of rolls. Inasmuch as these rolls are removed a considerable distance from the torch, the molten metal in the cleft cools before it reaches the bite or line of compression of the second pair of rolls. When it reaches this point, the metal is sufficiently cooled so that it can take the necessary pressure to reliably grip the tube for feeding purposes without pressing up an objectionable burr. Furthermore, the metal at this time has become sufficiently hardened so that when it is pressed together the weld is finished, by an additional forging weld, such as the old-fashioned blacksmith used to effect by heating up the metal to a red heat and hammering it together. This secures a coalescence of the metal under such small degree of plasticity as to be calculated to hold the weld after the metal leaves the compression rolls. In the old practice where the metal is pressed together at substantially the point of greatest fluidity the weld sometimes opened as the tube left the pressure zone.

Such opening we find is not likely to occur with our new method and arrangement of welding rolls, for the reason that the fluid metal is allowed to run and puddle together at the first set of rolls and in the zone between the two sets of rolls, and finally after the same has run together and more or less hardened, it is given a final pressing together or a forging weld.

This arrangement of rolls and process avoids burning through the holes in the tube due to undependable feed, avoids parts of the weld opening up due to premature release of pressure before the united metal has had a chance to cool, and further it permits the weld to be made clear through to the interior of the tube with a less expenditure of heat energy than has heretofore been found necessary.

What I claim is:

1. The method of gas-welding tube, which comprises causing the tube to travel longitudinally, the holding of the edges of the tube in contact only on the inside of the tube, the applying of the gas flame over the cleft so formed, and finally applying the compression stress to force the edges firmly together at some distance behind the torch so as to permit the melted metal to more or less congeal before it is subjected to the zone of greatest pressure.

2. The method of gas welding, which comprises causing the tube to move longitudinally, pressing the edges of the tube together only on the inside of the tube leaving a cleft in the tube for a considerable distance, applying the welding heat directly over the cleft, and finally the applying of the pinching together pressure at considerable distance to the rear of the welding heat to permit the welded portions to somewhat congeal before they are pressed firmly together.

3. The method of gas welding, which comprises the passing of the tube longitudinally, pressing the tube together in one zone lightly so as to simply cause the edges of the tube to meet on the inside leaving a seam cleft, applying the welding heat thereover, then passing through a cooling zone which permits the heated portion to more or less congeal, and finally applying the greatest compression stress after the weld has somewhat congealed by passing through said cooling zone, the said compression stress serving also to feed the tube along.

In testimony whereof I have affixed my signature.

RICHARD O. BERG.